US007475826B2

(12) United States Patent
Stonoha

(10) Patent No.: US 7,475,826 B2
(45) Date of Patent: Jan. 13, 2009

(54) CODED MATRICES AND LABELS FOR MAGNETIC TAPE CARTRIDGES AND METHOD OF MAKING SAME

(75) Inventor: Joseph R. Stonoha, Fairfield, CT (US)

(73) Assignee: Netc, LLC, Trumbull, CT (US)

( * ) Notice: Subject to any disclaimer, the term of this patent is extended or adjusted under 35 U.S.C. 154(b) by 124 days.

(21) Appl. No.: 11/414,454

(22) Filed: Apr. 28, 2006

(65) Prior Publication Data

US 2006/0261176 A1    Nov. 23, 2006

Related U.S. Application Data

(60) Provisional application No. 60/676,408, filed on Apr. 29, 2005.

(51) Int. Cl.
*G06K 19/06* (2006.01)
(52) U.S. Cl. .................................. 235/494; 235/462.01
(58) Field of Classification Search ................... 283/81; 235/460, 462.02, 462.05, 488, 494, 462.01
See application file for complete search history.

(56) References Cited

U.S. PATENT DOCUMENTS

| | | | | | |
|---|---|---|---|---|---|
| 4,844,509 | A | * | 7/1989 | Kasprzak et al. | 283/81 |
| 4,856,820 | A | * | 8/1989 | Kasprzak et al. | 283/81 |
| 5,083,816 | A | * | 1/1992 | Folga et al. | 283/81 |
| 5,489,767 | A | * | 2/1996 | Billington | 235/437 |
| 5,573,277 | A | * | 11/1996 | Petkovsek | 283/79 |
| 5,979,941 | A | * | 11/1999 | Mosher et al. | 283/67 |
| 6,062,481 | A | * | 5/2000 | Storch et al. | 235/494 |
| 6,726,252 | B1 | * | 4/2004 | Chaikel et al. | 283/74 |

* cited by examiner

*Primary Examiner*—Kumiko C Koyama
(74) *Attorney, Agent, or Firm*—Day Pitney LLP

(57) ABSTRACT

A method of generating messaging on a matrix having a plurality of labels with a computer in response to entries from an input means to complete a job. The matrix and/or one of the plurality of labels has at least one message thereon. At least one message is generated by entering a new message to a textbox after clicking on an first button, and selecting a standard labeling format and position to which the message will be added; and copying the message into the format from a desired messaging tab, and copying the new message into the job, and printing at least one matrix having said new message on a backing film.

3 Claims, 21 Drawing Sheets

CODED MATRICES AND LABELS FOR MAGNETIC TAPE CARTRIDGES AND METHOD OF MAKING SAME

This application claims the benefit of U.S. Provisional Patent Application Ser. No. 60/676,408 filed on Apr. 29, 2005, the contents of which are incorporated by reference herein.

BACKGROUND OF THE INVENTION

1. Field of the Invention

This invention relates to a coded matrices and labels for magnetic tape cartridges and the program used to generate such matrices and labels.

2. Description of the Related Art

Labeling of goods and products is of great significance in all aspects of industry. The accuracy of the label is critical not only for purposes of pricing but also for identification, as well. Identification of goods or products not only classifies the type of goods but also can provide additional information such as important dates regarding the goods. Such labels are often part of a larger matrix carried on a large film from which they are peeled. Frequently, such labels are read by computers that use either optical character recognition capabilites or bar code scanning to expedite processing.

When an array of labels are generated, for example, for a computer disk storage systems, the label often contains bar codes, numerical codes and color coded information. Similarly, the label and/or matrix that surrounds each label might contain bar codes, numerical codes as well. However, often additional indentifying information or status-related information would be very helpful in such storage systems. Status related information might be confidentiality information and government contractual information that could also be included on either or both the labels and matrix. Additionally, vendors of labeling systems could also include to both the label and the film to convey advertising specials or website information about their company. Computer labels might also contain graphical information that an individual could quickly observe without reading. Generally, the matrix and labels are capable of containing similar information.

Presently, there does not exist such capability to produce such labels and matrices containing such graphical information or human readable information. Accordingly, there exists a need for labels and matrices that of graphical information such as, human readable and computer readable information and an interactive computer display screens to generate such labels and matrices.

SUMMARY OF THE INVENTION

It is an object of the present invention to provide a plurality of labels in an array on a matrix, the matrix having at least two columns and containing at least one message thereon.

It is also an object of the present invention to provide a plurality of labels in an array on a matrix, the matrix having at least two columns and each of the labels containing a message thereon.

It is further the object of the present invention to provide an a plurality of labels in an array on a matrix, the matrix having at least two columns of labels and containing at least one advertisement thereon and each of the labels containing at least one message thereon.

It is yet a further object of the present invention to provide a plurality of labels in an array, each of the plurality of labels containing a bar code and human readable information, the human readable portion being 50% to 60% the length of the bar code portion to accommodate additional messaging thereon.

It is yet a still further object of the present invention to generate a plurality of labels in an array on a matrix using a computer interface, the matrix having at least two columns and containing at least one message thereon.

It is also an object of the present invention to generate a plurality of labels in an array on a matrix using a computer interface, the matrix having at least two columns and each of the labels in the array containing a message thereon.

It is another the object of the present invention to generate a plurality of labels in an array on a matrix using a computer interface, the matrix having at least two columns of labels and containing at least one advertisement thereon and each of the labels containing at least one message thereon.

These and other objects of the invention are achieved by matrix supported on a film backing having a plurality of labels. A blank portion surrounding the plurality of labels is also positioned on the film backing. Each label has at least two columns, where one of the at least two columns has human readable characters thereon that is 50% to 60% of the length of the other of the two columns; the other of the two columns having barcodes thereon. At least one of said plurality of labels or the blank portion surrounding the plurality of labels has a message thereon.

A method of generating messaging on a matrix having a plurality of labels with a computer in response to entries from an input means to complete a job is provided. Either the matrix and/or one or more of the plurality of labels has at least one message thereon. The method including entering a new message to a textbox after clicking on an first button; selecting a standard labeling format and position to which the message will be added; copying the message into the format from a desired messaging tab; copying the new message into the job; and printing at least one matrix having said new message on a backing film.

These and other objects of the invention will be described herein.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DETAILED DESCRIPTION OF THE INVENTION

Figure 1:
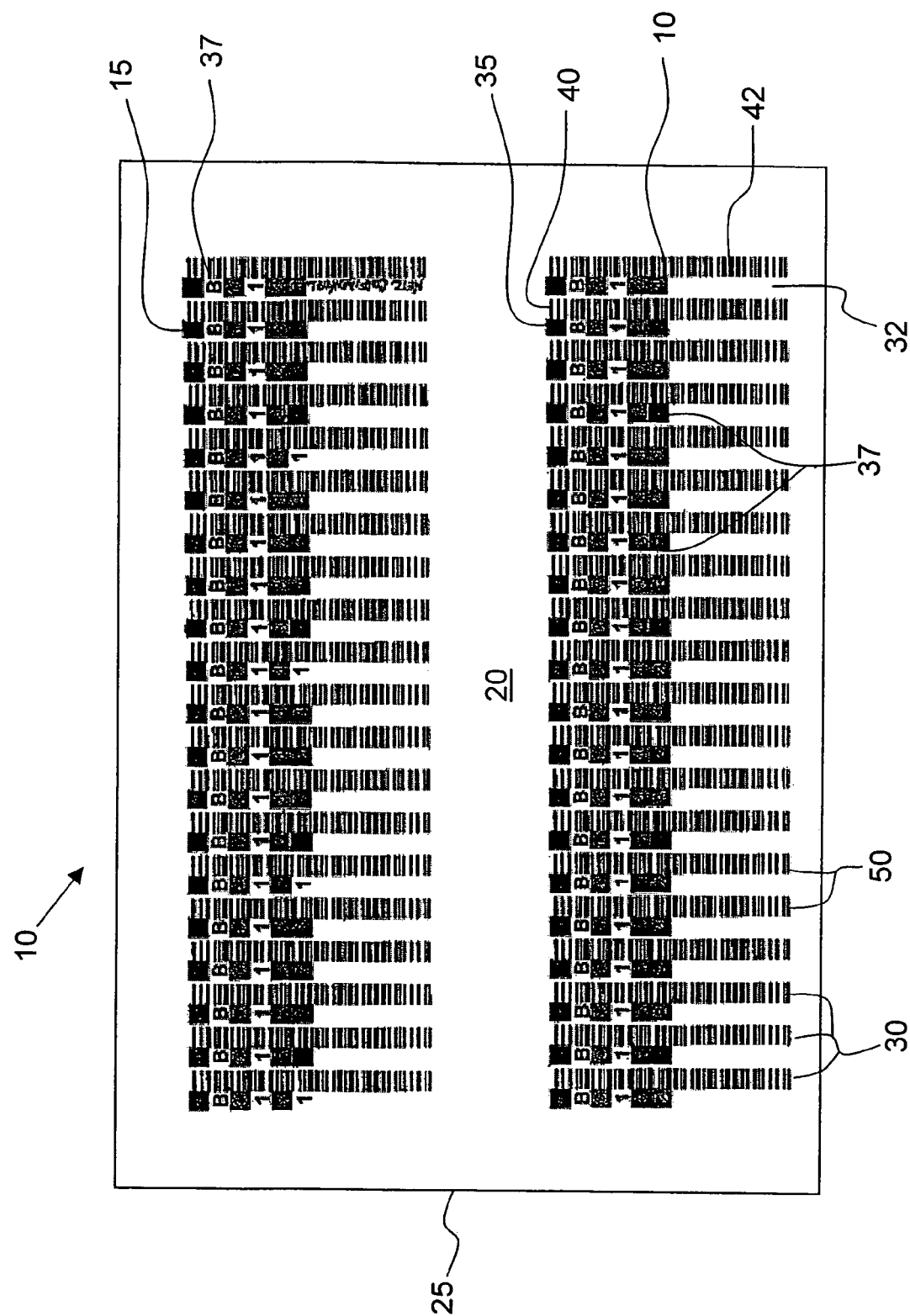
FIG. 1 is a plan of a matrix having a series of labels for identifying magnetic tap cartridges according to the first embodiment of the present invention.

Referring to FIG. 1, a matrix 10 having a plurality of labels arranged in an array of labels 15 according to the first embodiment of the present invention is shown. The array of labels 15 and the blank space 20 between the labels together form matrix 10. Matrix 10 is a substrate that is adhesively and removable affixed to a film of paper 25. Each label 30 in the plurality of labels 15 can be peeled from film 25 to be affixed to a magnetic tape cartridge (not shown) for identification. Blank space 20 between array of labels 15 is also removable from the film 25.

Each label 30 in the array has a human readable column 35 and a column 40 containing machine readable bar codes 42. Each column 35 and 40 has machine readable characters. Column 35 has human readable characters 37 that are readable by a scanner equipped with optical character recognition capability. Column 35 has a sequence of continuous letters and numbers. Human readable characters 37 are on a color coded background that corresponds to a respective character. For example, all of the human readable characters 37 of a number "8" have an orange background. Barcode column 40 has a series of light and dark dashed or barcodes 42 that correspond to one of the human readable characters 37 in column 35. Barcodes 42 of column 40 are readable by a scanner using a charge coupled device (CCD).

Human readable characters 37 of column 35 and column 40 are arranged in a parallel orientation relative to each other although other configurations could also be used. Column 40 extends substantially the entire length of each label 30. Human readable column 35 extends approximately 50% to 60% of the length of the column 40. The shorter column 35 portion allows additional material to be printed in label 30 in a blank space 32 that is traditionally occupied by human readable portion.

The information that can be included on each label 30 in blank space 32 can be identifying material for the contents of the magnetic tape cartridge. For example, the additional information could be logos, company names, other barcodes or color designations. The additional information could also be classifiers such as "classified", "proprietary", "Confidential", or "Unclassified", etc. Further, date designations to could also be used to indicate the length of time that a tape is to be retained pursuant to a government contract, for example.

Figure 2:
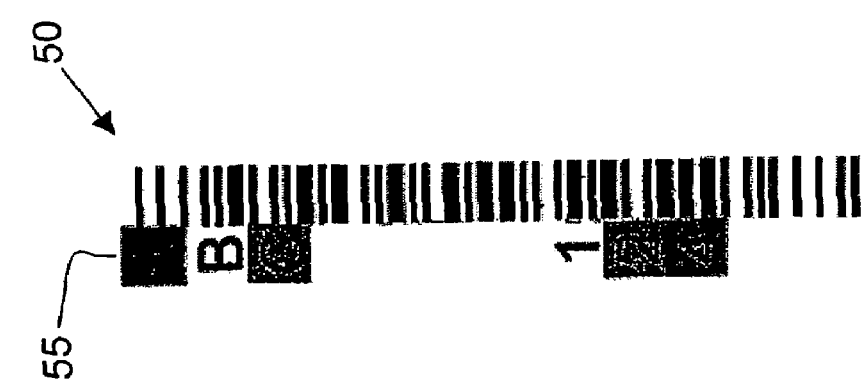
FIG. 2 is a plan view of a single label of the series of labels of the present invention according to the second embodiment of the present invention.

In FIG. 2, a second embodiment of the magnetic tape cartridge label 50 is shown. Label 50 of this embodiment has human readable characters 55 that are non-continuous. This example shows letters that are separated from the numbers; however, any configuration of letters and numbers could have been chosen. For example, two of the letters in the human readable characters 55 could be spaced from a letter together with three of the numbers. Any combination of spaced letters and numbers is also possible. In this embodiment, additional information as in the example above, could be stored in the blank portion of the label.

Figure 3:
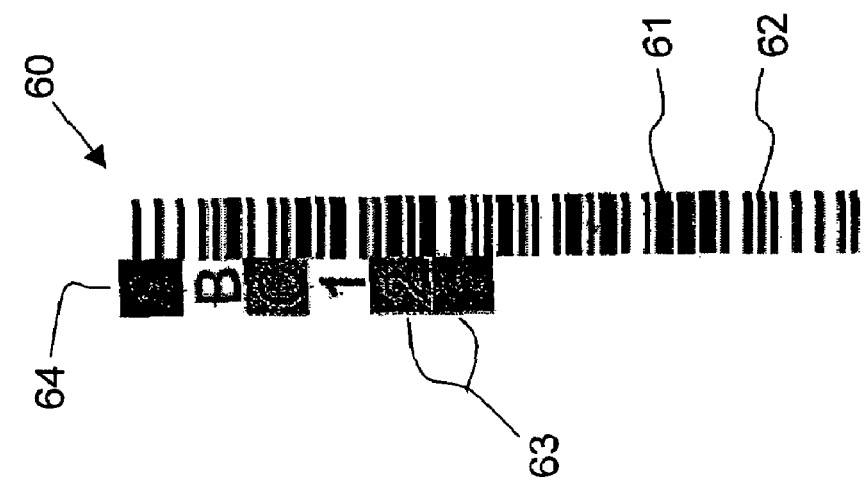
FIG. 3 is a plan view of a single label having a scrambled bar code according to a third embodiment of the present invention.

In the embodiment of FIG. 3, a label 60 is shown having a bar code column 62 and a human readable column 64. Bar code column 62 has barcode characters 61 and a human readable column 64 having characters 63. Human readable characters 63 are scrambled. Scrambling exists when no two corresponding bar code characters 61 and human readable characters 63 from columns 62 and 64, respectively, are side-by-side. The term "side-by-side" includes the configuration in which each character of column 61 is diagonally adjacent to its corresponding character of column 64. The scrambling of the human readable characters 63 will allow for accurate identification of the magnetic tape cartridge by an charge coupled device even if label 60 has a substantial portion that is missing or obliterated. Similarly, barcode column 61 can also be scrambled and the human readable characters 63 can be in the unscrambled sequence. By having either the human readable column 64 or the bar code column 62 scrambled, the likelihood that a damaged label will be human or machine readable is increased.

Figure 4:
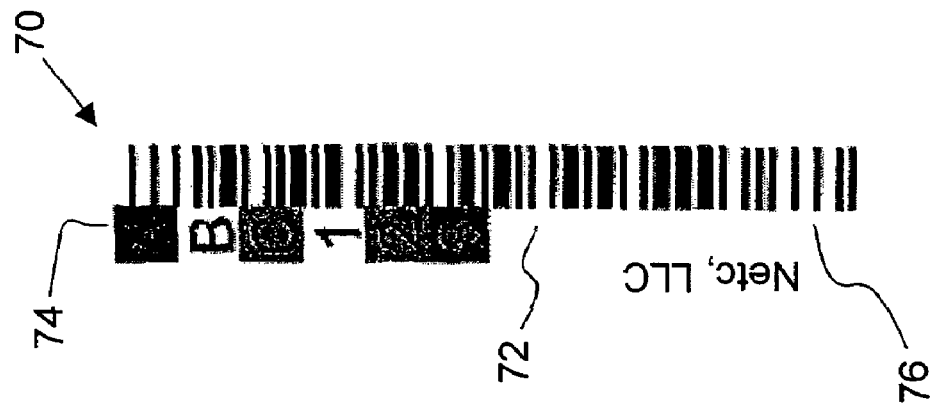
FIG. 4 is a plan view of a single label having signature messaging on the label according to a fourth embodiment of the present invention.

In FIG. 4, a fourth embodiment of the magnetic tape cartridge label 70 is shown. In this embodiment, the label has identifying material called a signature message 76 located in the blank space 72 immediately adjacent to the human and machine readable characters 74 and 78, respectively. By having a signature message 76 on label 70, a redundant identifier can be inserted or additional information can be stored with regard to the magnetic tape cartridge. While FIG. 4 shows the human-readable characters 74 in a continuous sequence, the sequence 74 could have been scrambled, non-continuous or scrambled and non-continuous.

Figure 5:
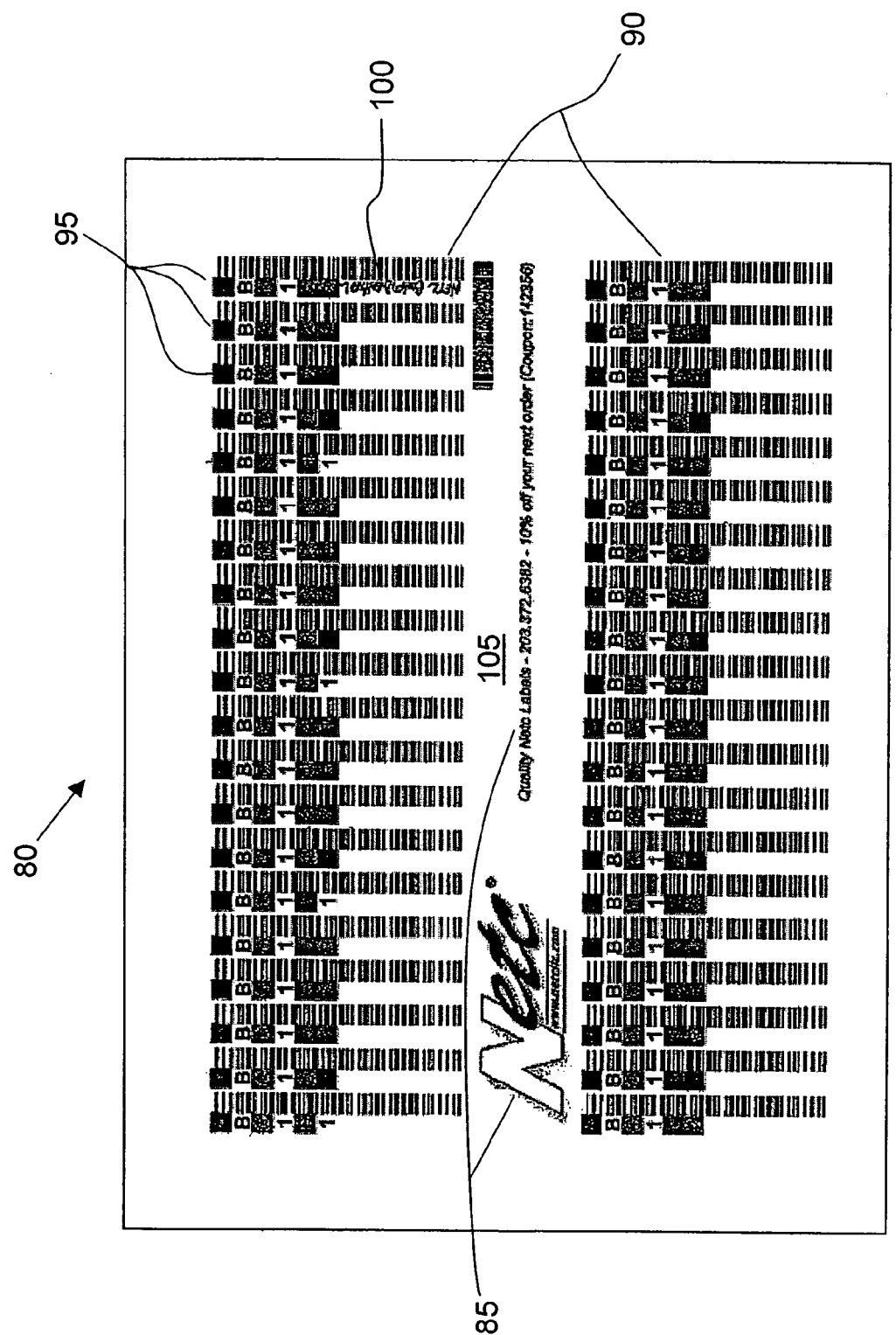
FIG. 5 is a plan view of a matrix having matrix messaging and a series of labels according to a fifth embodiment of the present invention.

In FIG. 5, a matrix 80 having a matrix message 85 and two columns of labels 90 according to a fifth embodiment is shown. One of the labels 95 has a signature message 100. In this embodiment, matrix message 85 is on the non-label portion of the substrate 105 between two columns of labels 90. Matrix message 85 can be similar to the information used for the signature message 100 on any of the labels and any combination of messages. Matrix message 85 could include, for example, additional information, such as, logos, company names, other barcodes or color designations. Such information could also include classifiers such as "classified", "proprietary", "Confidential", or "Unclassified", etc. Further, coupons, offers, specials or advertising from other vendors could also be used.

Figure 6:
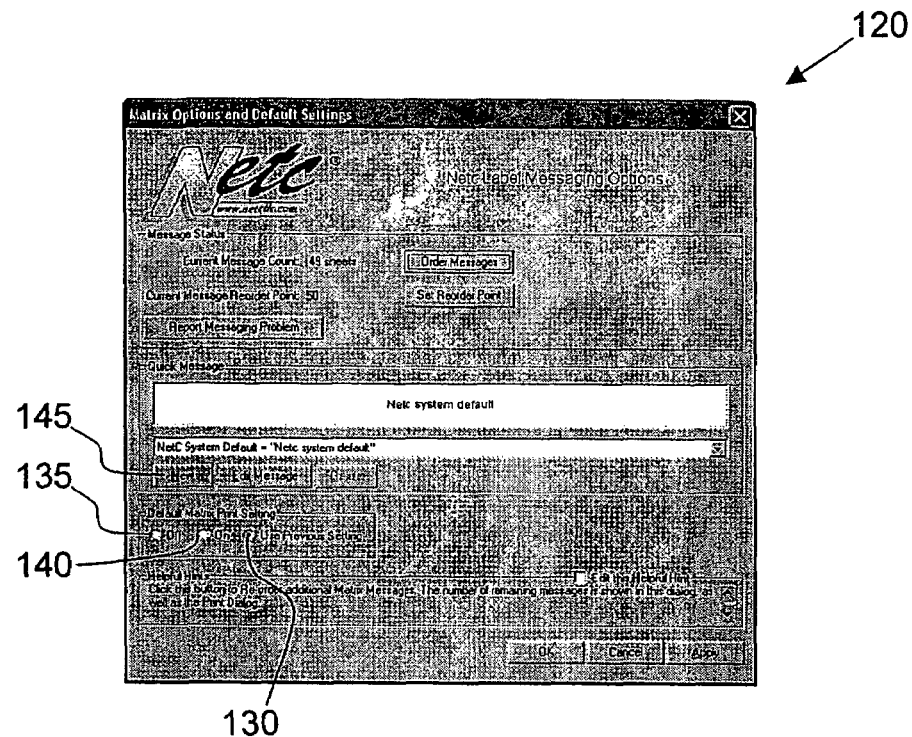
FIGS. 6 through 18 are display screens to create a matrix message.
Figure 7:
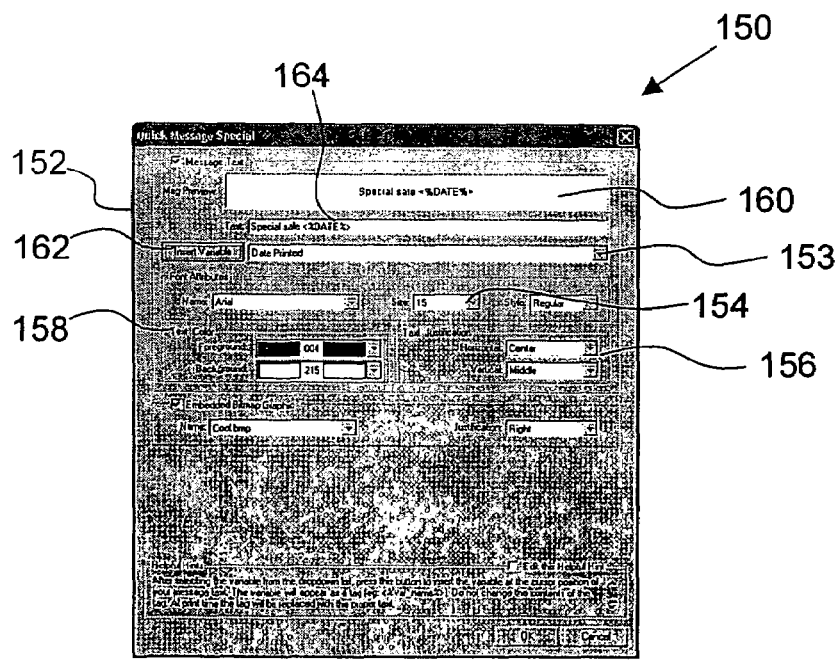

FIG. 6 shows a display screen 120 that includes various user entry areas to commence the process for generating matrix messaging on the matrix having labels, similar to the matrix 80 of FIG. 5. The matrix generating process is supported on a windows based operating system. Matrix messages 85 that appear between labels in FIG. 5, can support graphics and text formats. Matrix messages support PDF 417, which is a 2 dimensional, scannable barcode format. Additionally, several matrix messages per sheet in different positions can be created. The user entry areas on display screen 120 or the display screens of any of the other Figures are user selectable options from which the user through operation of a key board and mouse (not shown) can input or edit indicia and/or attributes for a matrix, a label or a series of matrices and labels.

To produce the screen shown in FIG. 6, the user locates the Matrix Messaging screen and selects the Options and Default Option. To set up the messaging, the user selects the Default Matrix Printing Setting that is appropriate for the particular application. If a Radio Button 135 in an Off setting, the user must set Radio Button 140 to an On setting to commence matrix printing, particularly if matrix messaging is not frequently used. If the user normally customizes the matrix area 80, the On setting should be selected and every time the user prints, the print dialog will appear with messaging turned On. If the user prints several jobs with Matrix On, then another batch Off, the Use Previous Setting Radio Button 130 should be selected and the print dialog will remember the last Matrix print setting from the previous print.

The user can create "Quick messages" as during Matrix Messaging. To do this, the user clicks New button 145 of FIG. 6, and enters the Quick message name, in this example, "Special sale" in the text field 151. Using Drop Down Menu 153, an embedded variable of "date" is chosen. The user then chooses the text style at menu 152, font at menu 154, bitmaps at checkbox 158, justifications at menu 156, etc. The cursor 152 is placed after the text "Special sale" and using Variable Insert Button 162 a centered text message 164 "Special sale "<%date%>" in 15 point Arial with a blue colored font is created.

Figure 8:
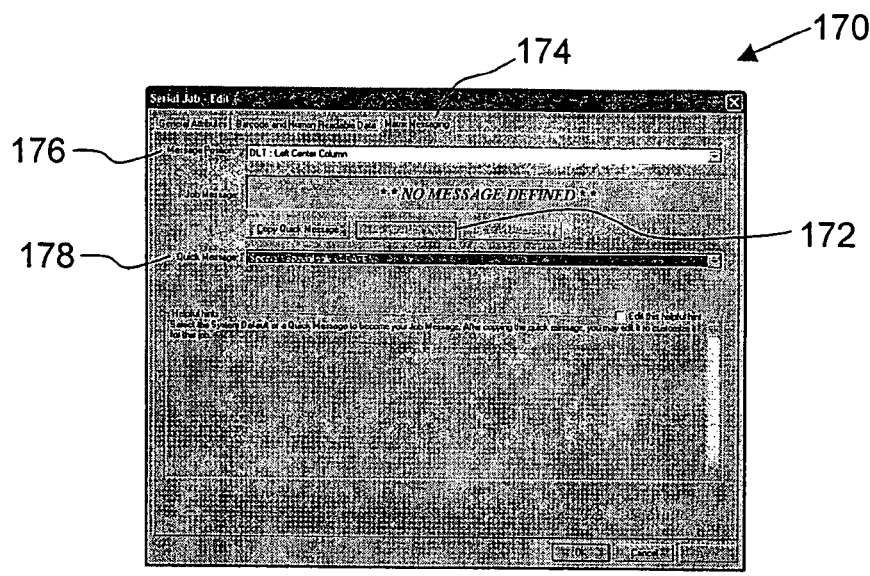
Figure 11:
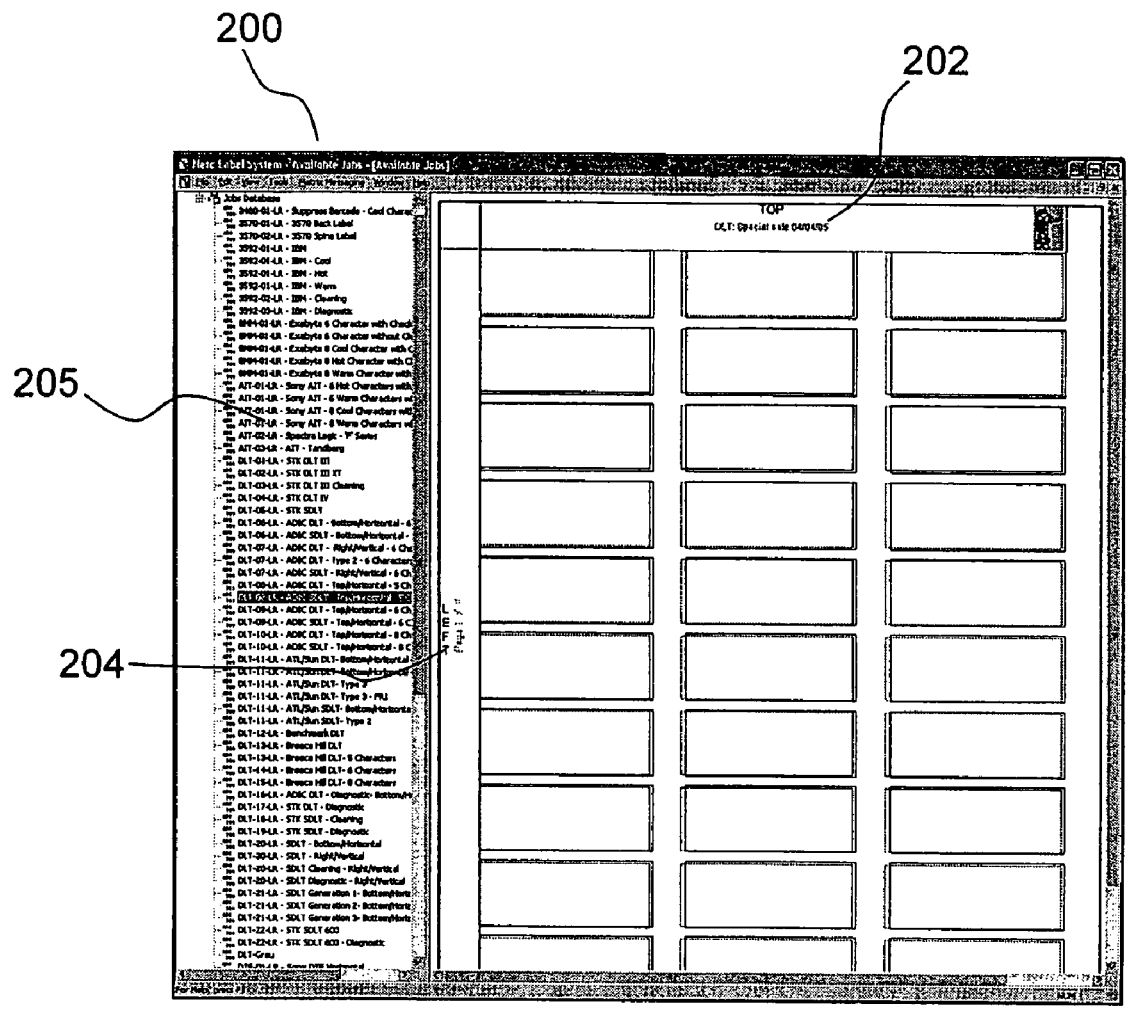

In FIG. 8 and FIG. 11, at screen 170 and screen 200, respectively, the job is identified and its position is selected. At the Job Tree View 205 including the labeling format, the user right clicks on Job Name and chooses edit to select the job to add the Matrix Message. In this example, a job using Digital Liner Tape (DLT), a labeling format know in the labeling industry, is chosen from at Job Tree View 205 as well as its position. The user then selects the last Tab 174 named "Matrix Messaging". At FIG. 8, at the Quick message Drop-down menu 178, the user selects the desired message (in this case the "special sale" message) and clicks "Copy Quick message" to copy the selected quick message into the job at the top position and then edit at button 172 to move to the next screen.

Figure 9:
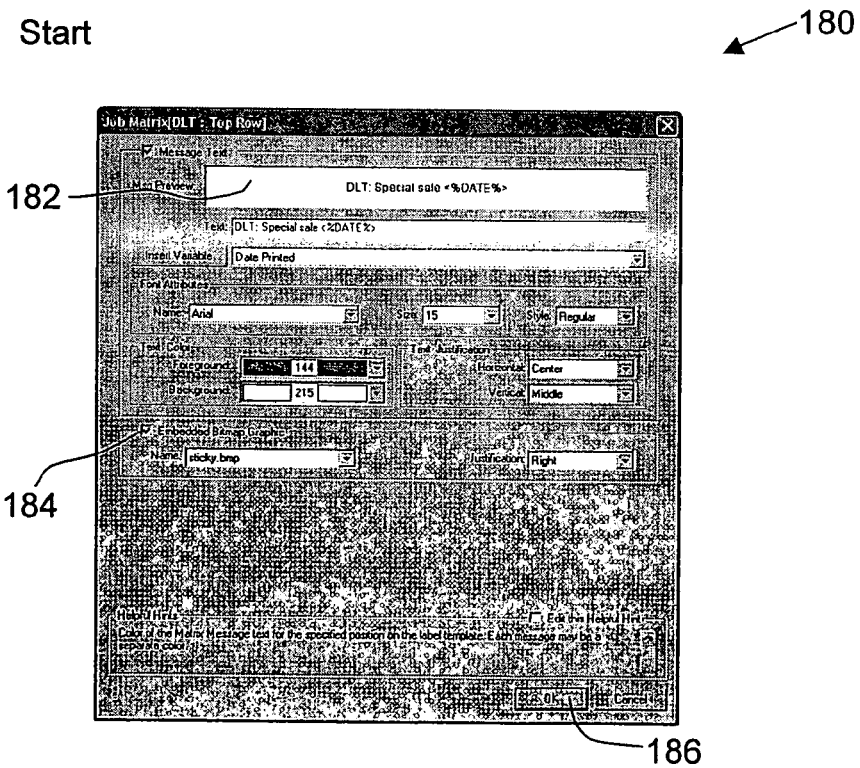

Referring to FIG. 9, at screen 180, after copying the quick message that appears in preview screen 182, the user clicks edit to add any text to the Text field 184. In this example, the user adds "DLT" to the front of the Text in Text field 184. Additionally the user checks box 186 for an embedded graphic to be entered into the matrix message, and selects the bitmap called "sticky.bmp". Using the Color Box 188, the color of the text may be changed.

Figure 10:
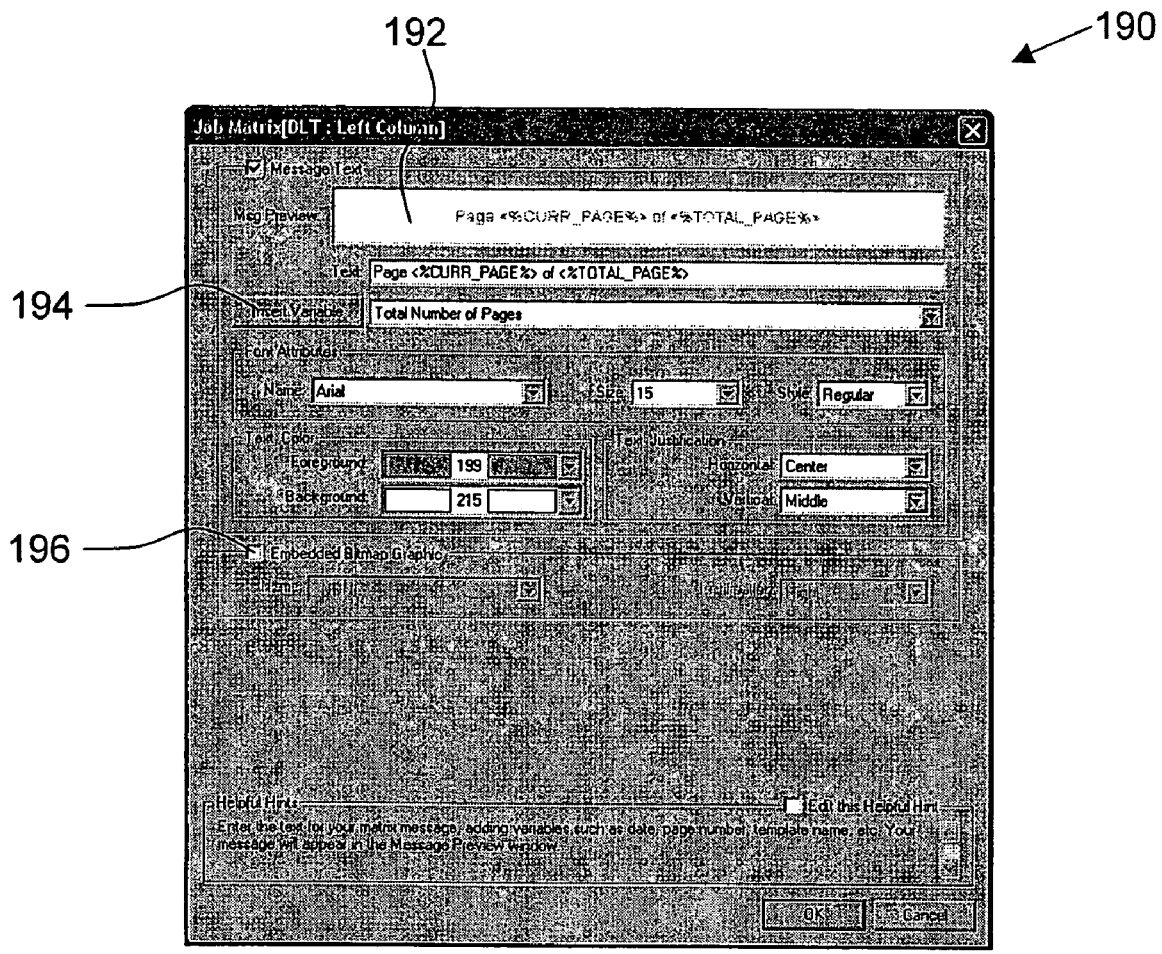

In FIG. 9, after clicking the "OK" button 189, the user can add a second message to the left border at screen 190 of FIG. 10. The "Left" column position is selected, and a variable message for the pages is selected using Insert Variable Box 194. In this example, the Embedded Bitmap Graphic Box 196 not activated, therefore only the text message appears. Alternatively, the Bitmap Box could be checked to allow for both text and graphics to appear.

Referring to FIG. 11, the user has created two messages for this DLT Job that are previewed on screen 200. The user exits the Job editor and right clicks on the Job to see "Sheet View". In screen 200, the user has created a top matrix message 202 and a let side matrix message 204. From the example that the user is creating, the top and left margins contain the Matrix messages. Future printouts will contain those messages with the variables containing the actual print time values.

Figure 12:
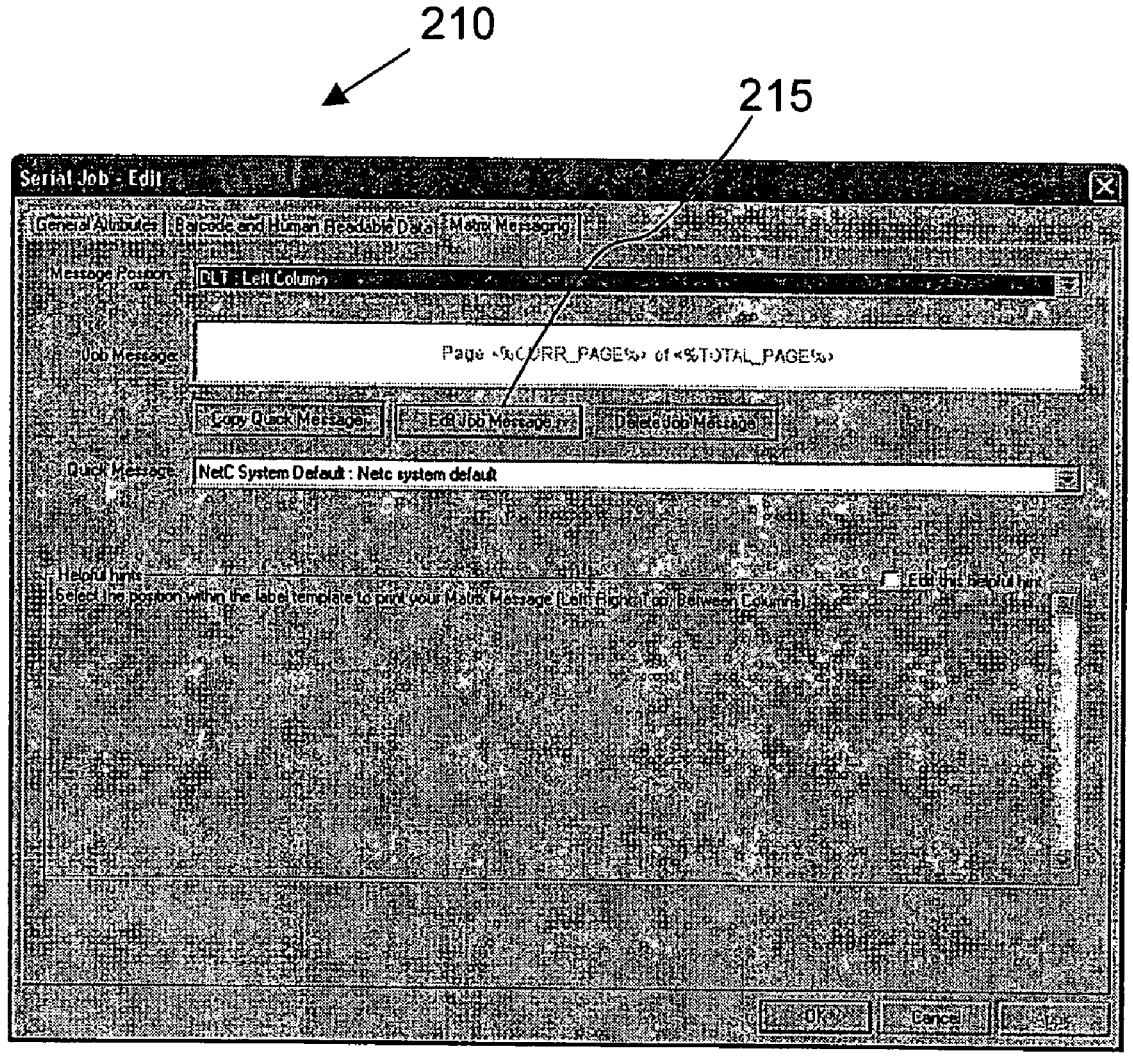
Figure 13:
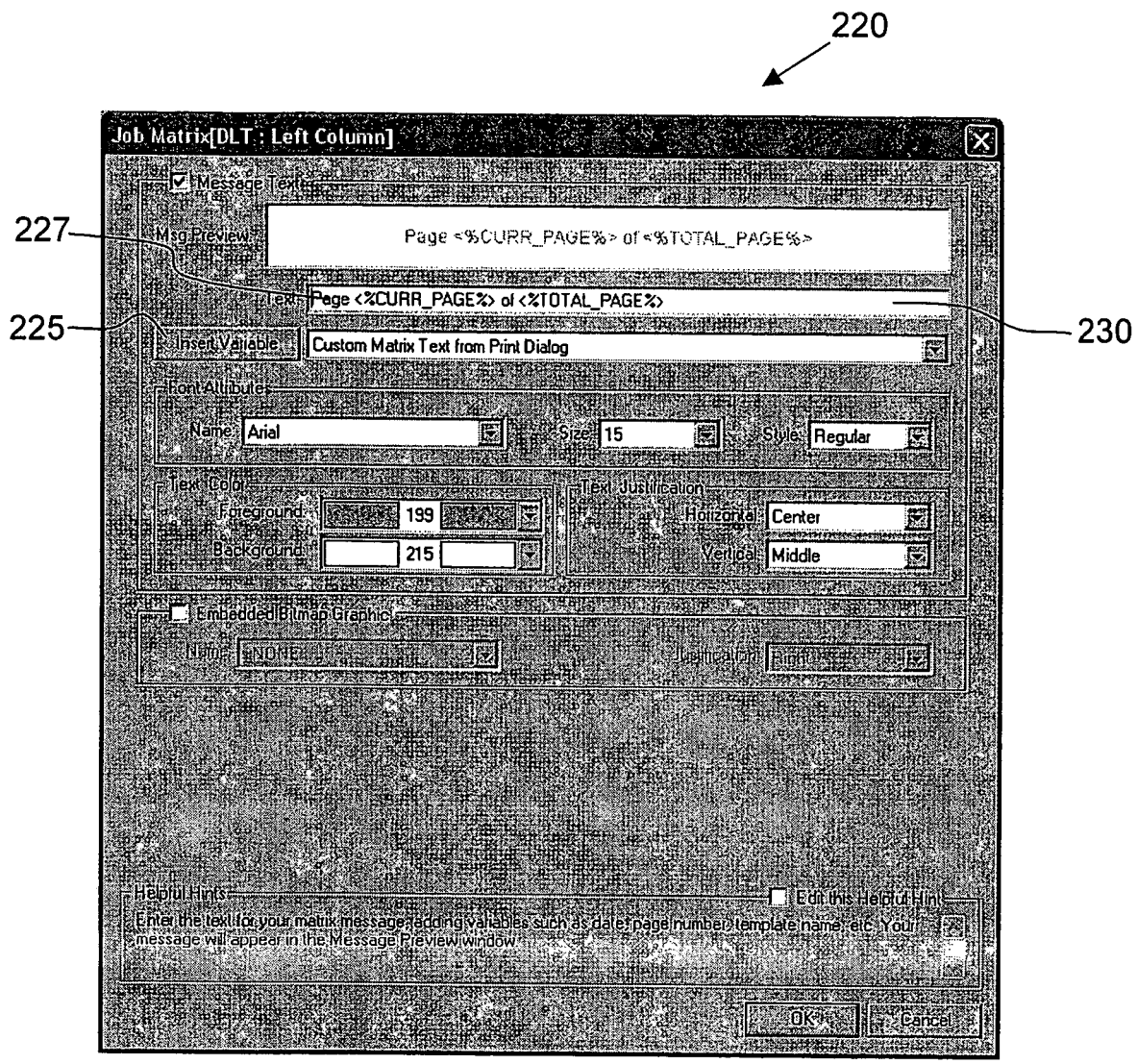
Figure 14:
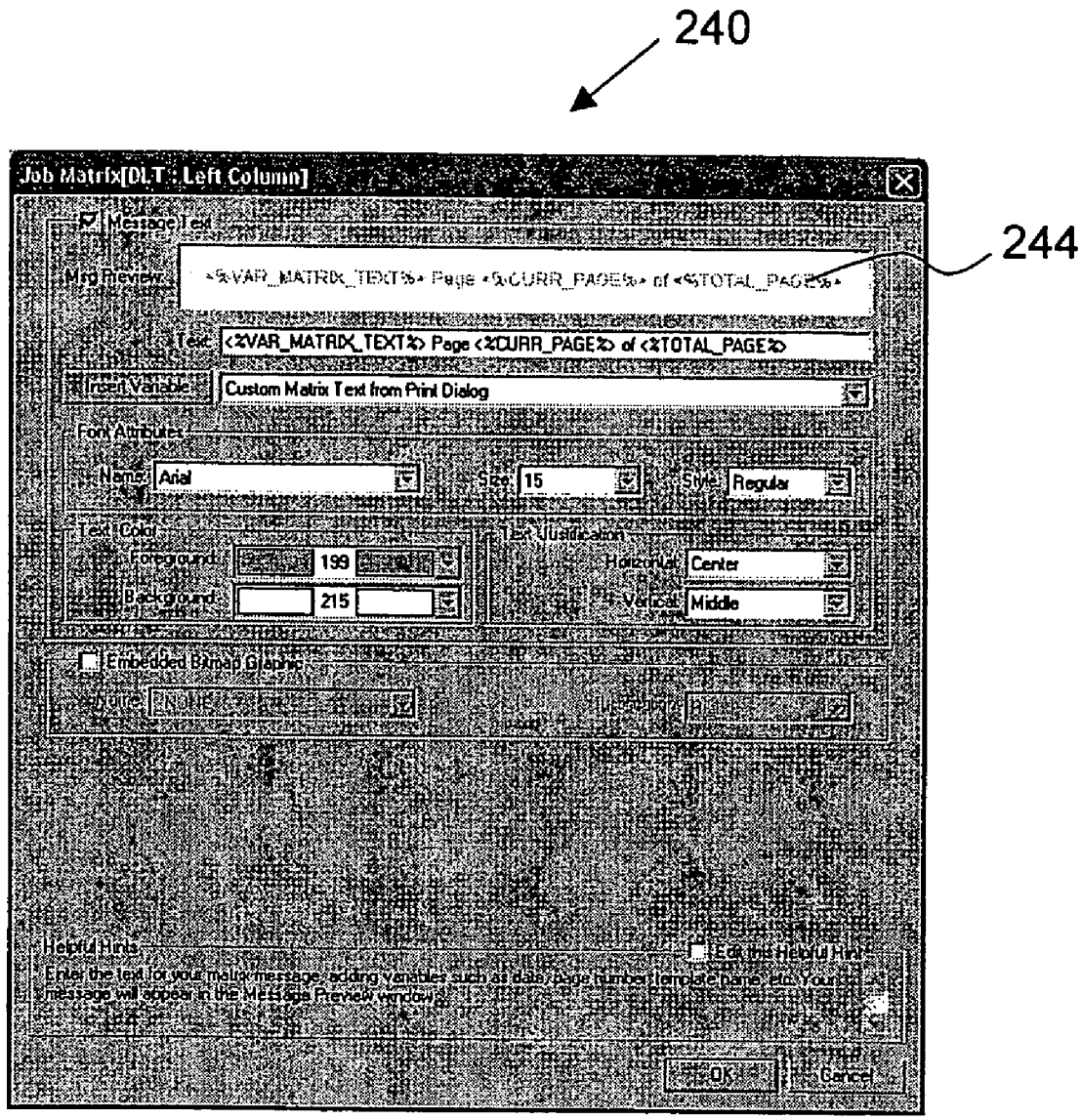
Figure 15:
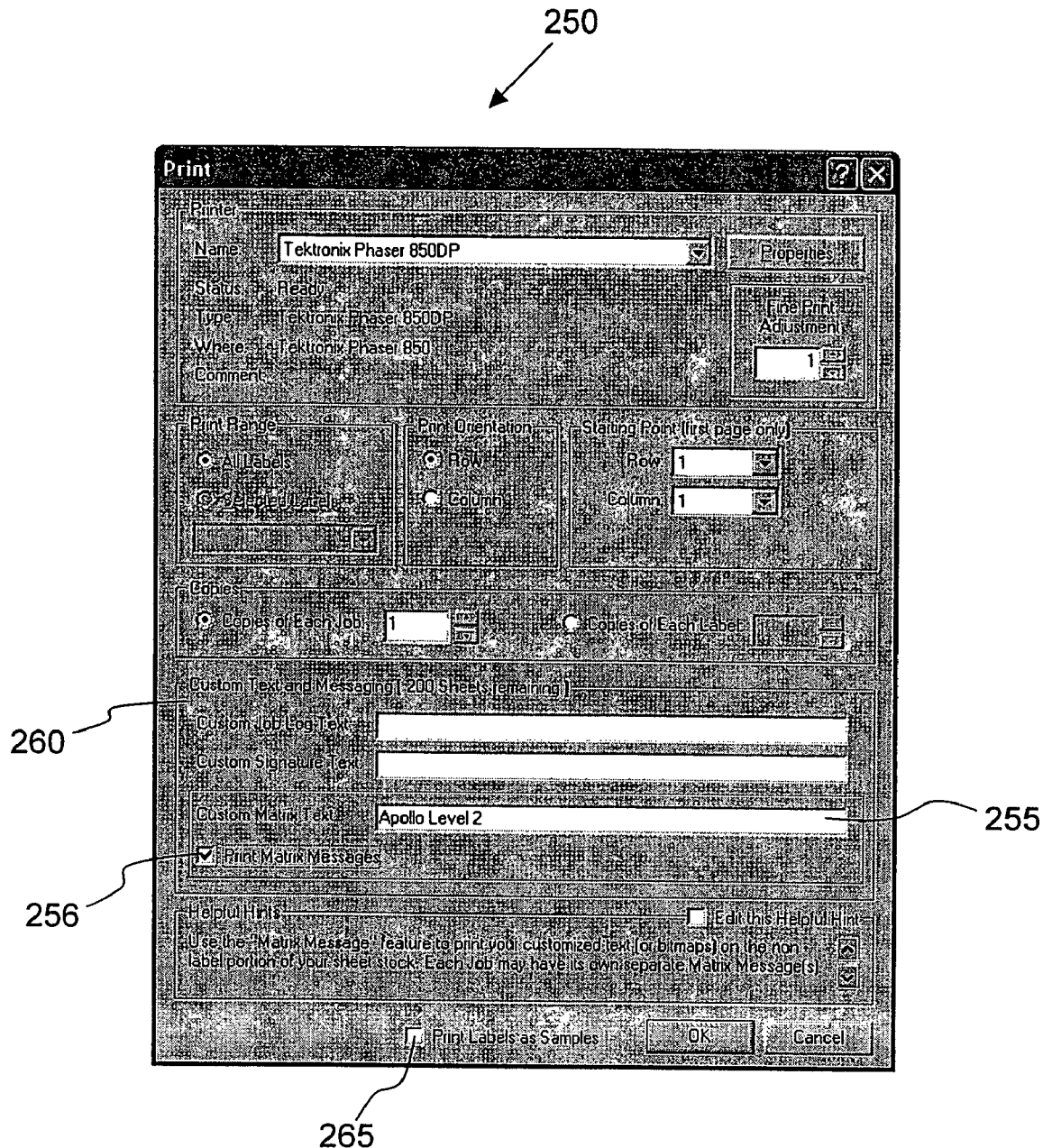

In FIG. 12, screen 210 is used if different text and variables need to be created each time a job is printed. The message may contain details concerning the date the message was created using the Edit Job Message button 215. Alternatively, messages to indicate the machine being used can be added. Referring to FIGS. 13 through 15, for example, at FIG. 15, the Tektronix Phaser 850DP printer is chosen at Dialog Box screen 250 and the Apollo Server is being selected. At screen 220 of FIG. 13, the cursor 227 is placed before "Page <%CURR_PAGE%> of <%TOTAL_PAGE%> to insert the text of "Apollo Server" as a variable at that location in the text. This information is inserted before the "Page x of y" text to indicate the machine that will be used. When Insert Variable Button 225 pressed, screen 240 showing the new variable in the Message Preview box 244. Further, the "Print Matrix Message" text box 256 is activated to ensure that the field "Apollo Level 2" at Field 255 will be printed.

The "Custom Text and Messaging Box 260 shows that [200 sheets remaining]" is shown. If the Messaging sheet count gets too low, the user will need to order additional messages. In Print Labels as Sample Box is checked, the user is able to "test print" the Job without consuming any remaining Messages.

Figure 16:
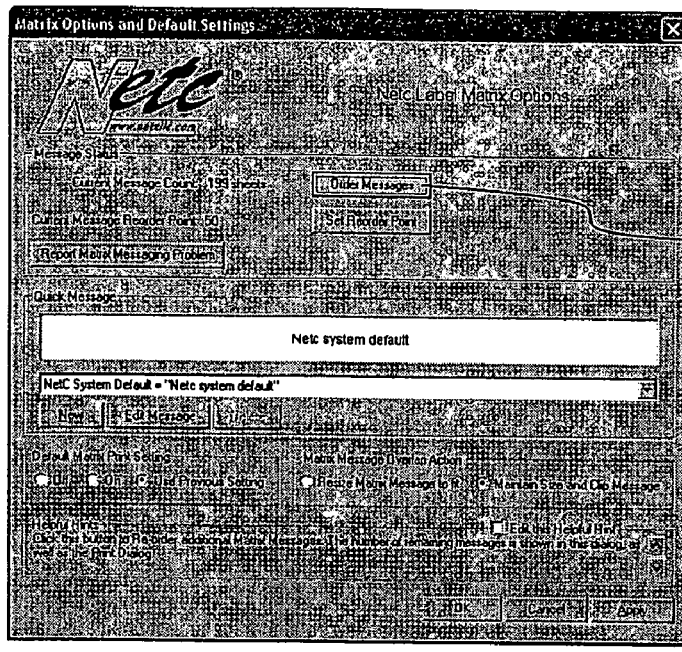
Figure 17:
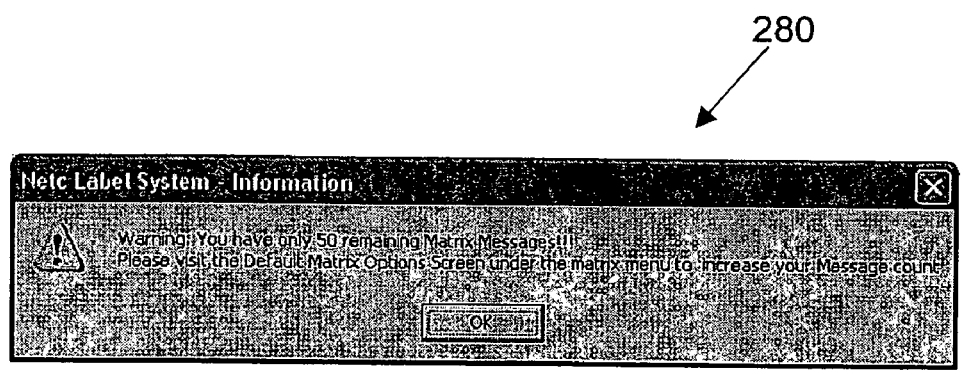
Figure 18:
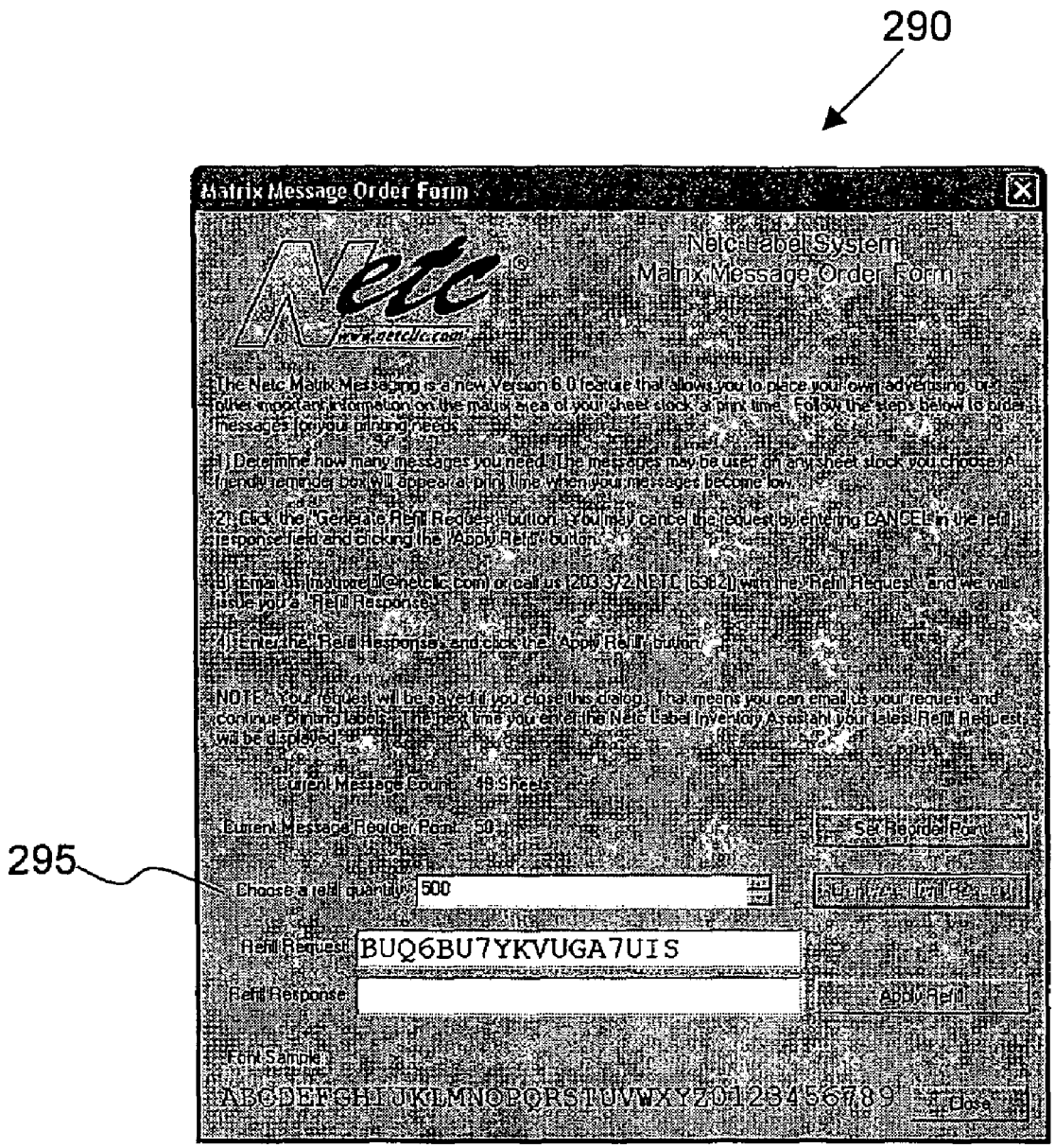

Referring to FIGS. 16 and 17, at screens 270 and 280, respectively, a reminder box will appear when printing. Referring to FIG. 18, at screen 290, the user can set an appropriate "Warning Level" at field 285. . The user goes to Matrix messaging—options and default settings to set the re-order point. In the screen, the field "Message Reorder point" is at 50 and Current Message count is 199. When the message count gets down to 50, a warning box will appear at print time, like the one shown at screen 280. To get more messages, the user can press the "Order Messages" button 275 in the Matrix options dialog.

Referring to FIG. 18, a re-order screen 290 is shown. In this example, 500 messages are being ordered. They will be added to the remaining 49, to provide a total of 549 messages. While 500 messages are being ordered, any number of messages could be ordered depending on the users system requirements. This dialog box is similar to the Netc Label Inventory Assistant dialog box. The user must choose the quantity, press the "Generate Refill Request" and email the Request string. When NetC LLC responds with the Refill Response, the user types it in clicks Apply refill. The remaining sheet count is adjusted. Both Matrix messages and Signature messages will consume the Message count. Signature messages are only available with certain sheet types and appear on label, while matrix messages are available for nearly all Label Template types and appear off label.

Figure 19:
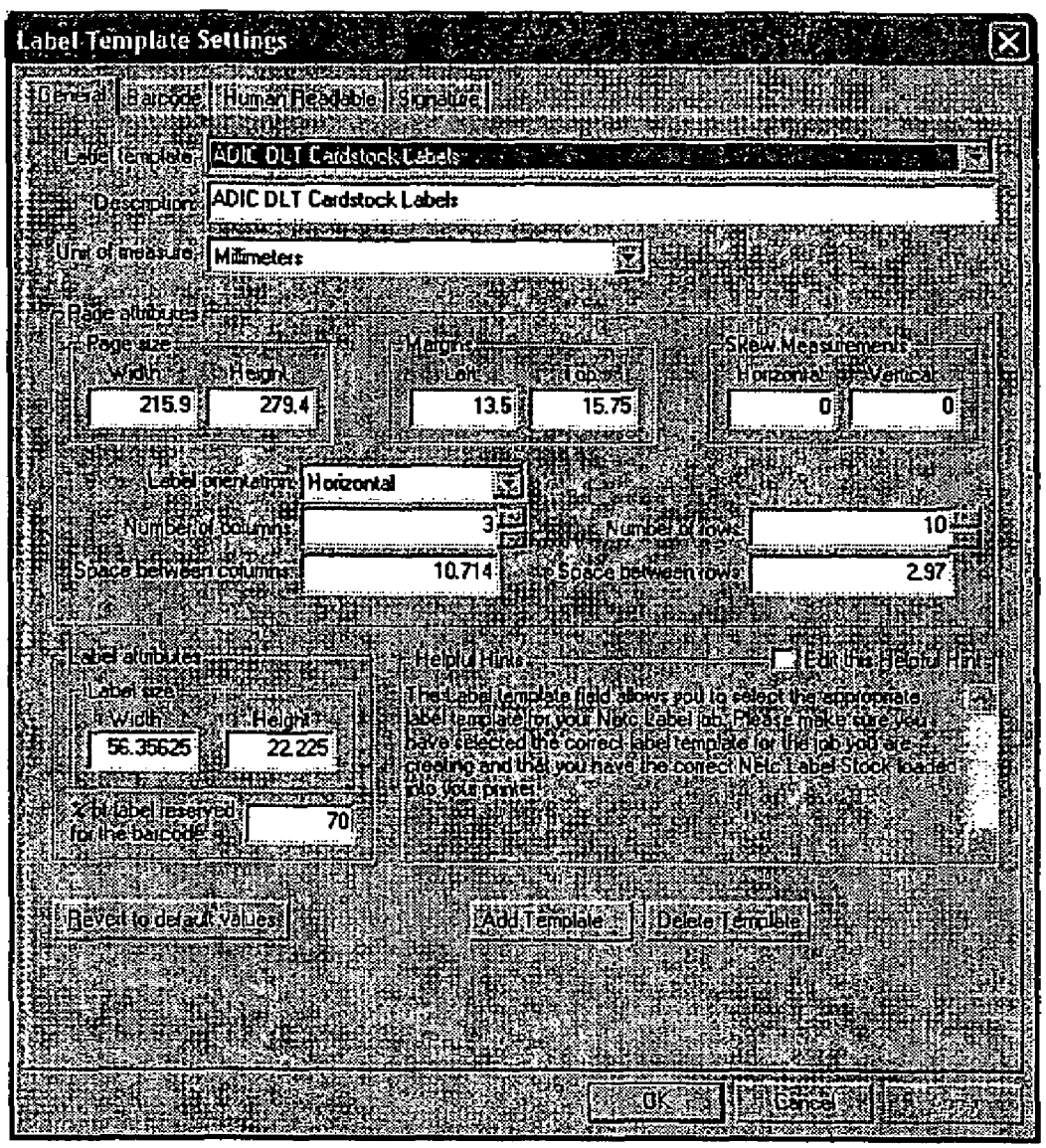
FIGS. 19 through 25 are display screens to create a signature message.

Referring to FIG. 19, at screen 300, the labels for the Signature Messaging are configured. The Page Attributes 305 are added including margins and orientations are entered in the appropriate boxes.

Figure 20:
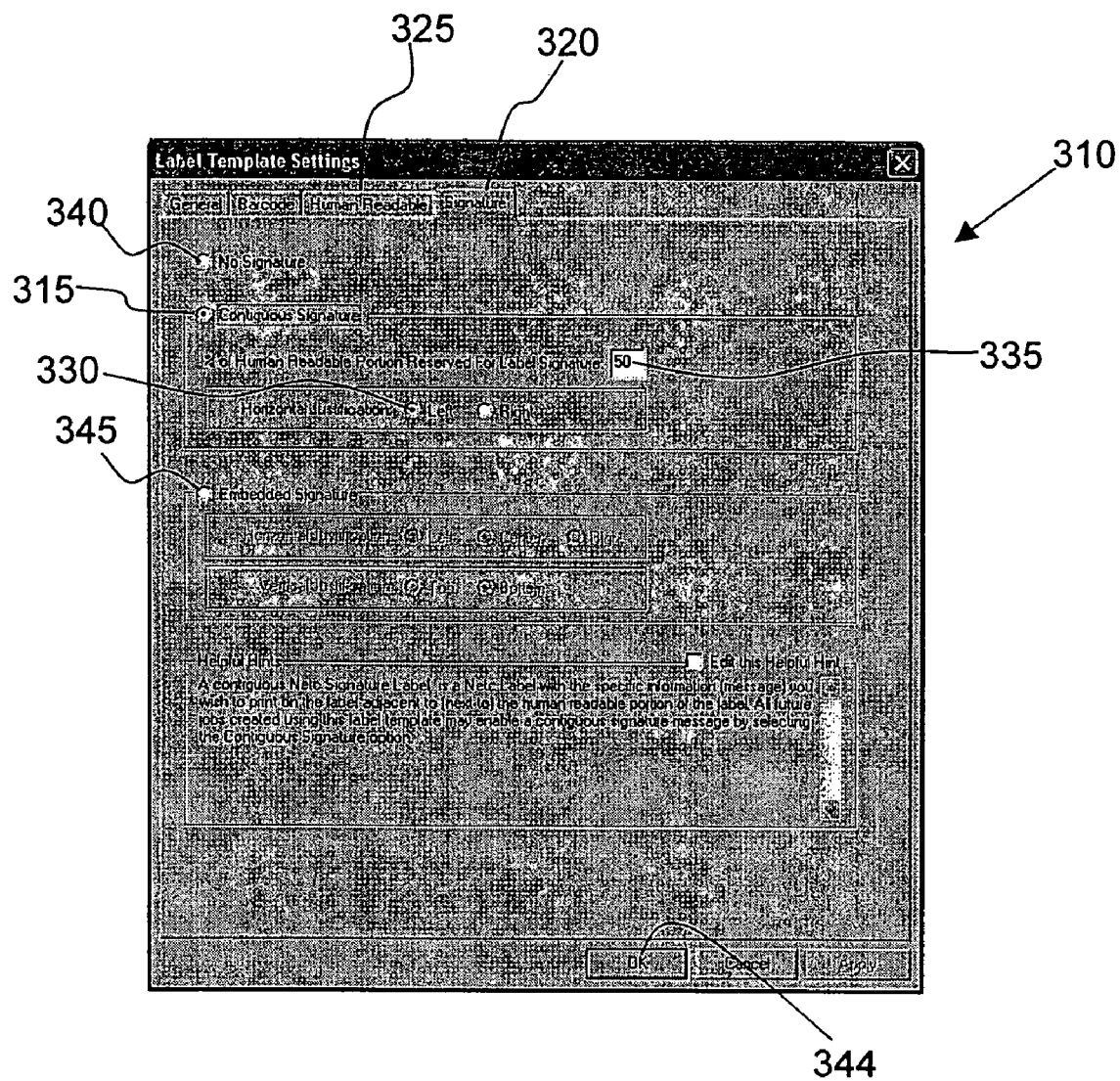

In FIG. 20 at screen 310, the signature labels are further edited and customized by adding customized messages to the individual labels 30 of the matrix 10 at the signature tab 320. Similar to Matrix messaging, Signature messaging can support graphics and text. The first step for signature messaging is to configure the Label Template. The two types of signature messaging to choose from are contiguous at Radio Box 315 and embedded messages at Radio Box 345. Both types will appear in the human readable section of a label. The difference is that a contiguous Signature Message appears to the side of the human readable information, while an embedded Signature Message appears within the human readable information. Normally, the Contiguous Signatures allow for more room, and therefore afford a longer text length/font size than Embedded Messages.

Referring to FIG. 20, the user will access the Human Readable tab to create the message. The Signature Tab after configuring for a Contiguous Signature message is shown. The user has configured the signature to be to the left of the Human Readable portion by activating Radio Button 330. Additionally, the user has allocated 50% of the space to the signature message by entering "50" in Box 335. If the use wishes to turn off Signature messages for this Label Template, "No Signature" Radio Button can be selected. Alternatively, the user could activate Radio Button 345 to switch to an Embedded Signature format.

Figure 21:
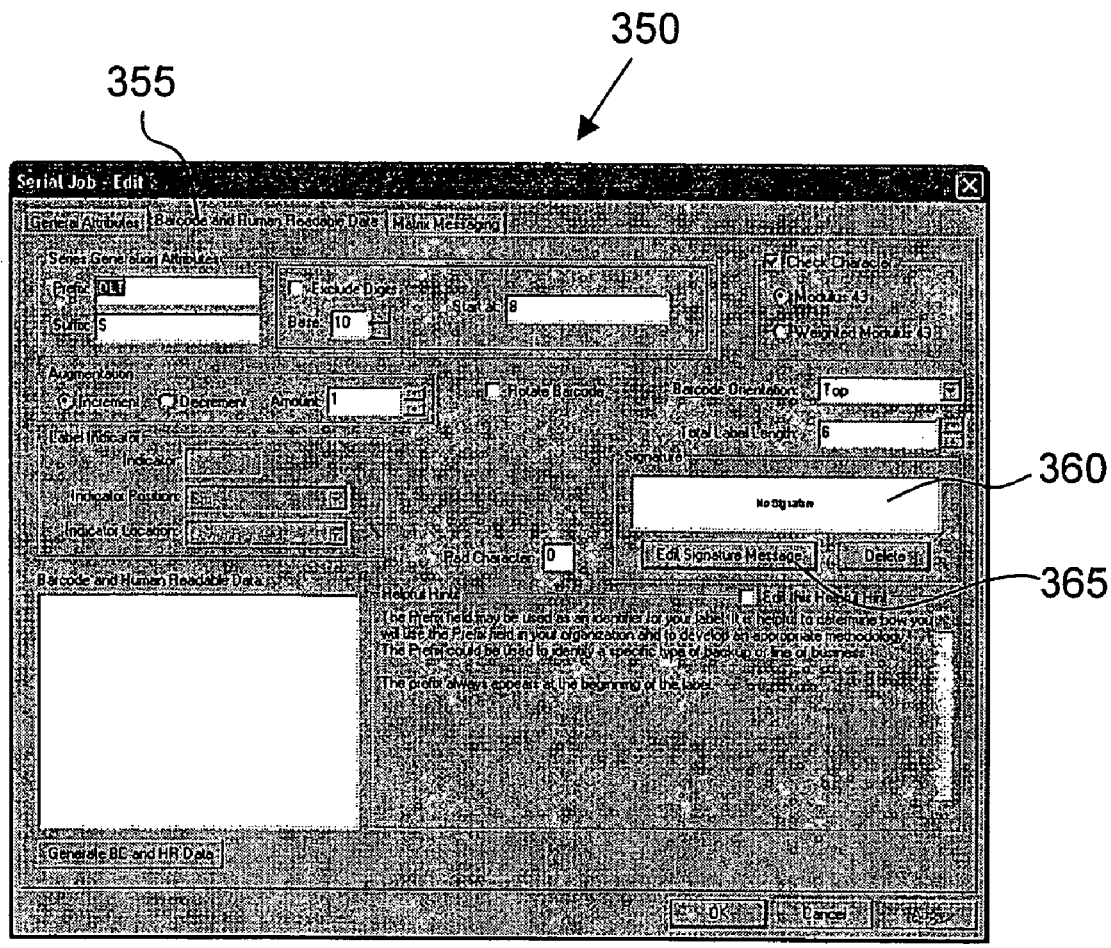

By pressing the OK button 344 at screen 310, the template is configured to create the signature label. Referring to FIG. 21, the user must edit the Signature Message using the Barcode and Human Readable Data tab 355 at screen 350. By entering desired text in Field 360 and clicking on box 365 a signature message is added or edited. The user edits label templates either 1) From the Edit menu, select "Label template . . . " or 2) if editing a Job, on the general attributes tab, by selecting the button "Edit label Template". In the example of FIG. 21, the user configures a DLT template for a Contiguous Signature Message in the Label Template Edit Dialog box. In FIG. 21, the new signature is entered into box 360 and is edited by clicking button 365.

Figure 22:
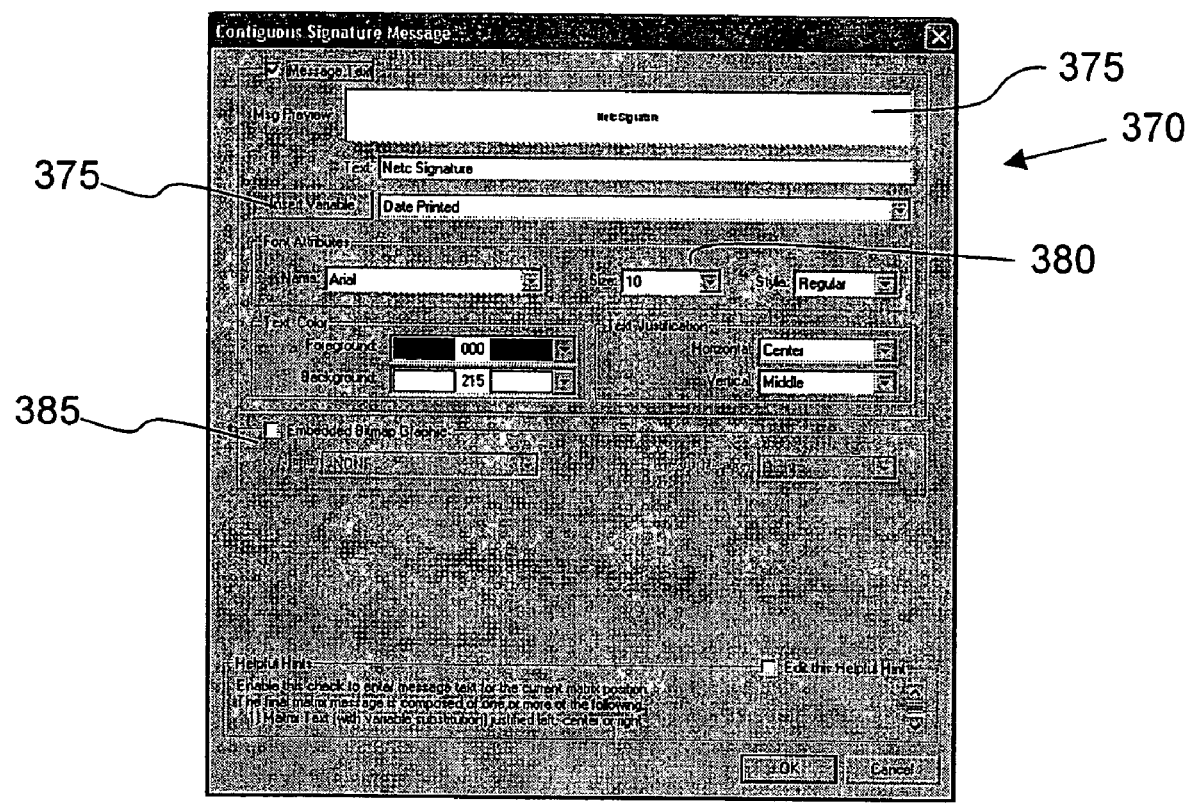

Referring to FIG. 22, the screen 370 shown in the Message Preview box 375 is a Signature Message of "Netc Signature". For a date to be printed in this message, the user must scroll down in the Drop Down Menu 373 and insert the variable by clicking on Insert Variable Box 376. Similarly, the changes to the font, size and justification for further customization.

Figure 23:
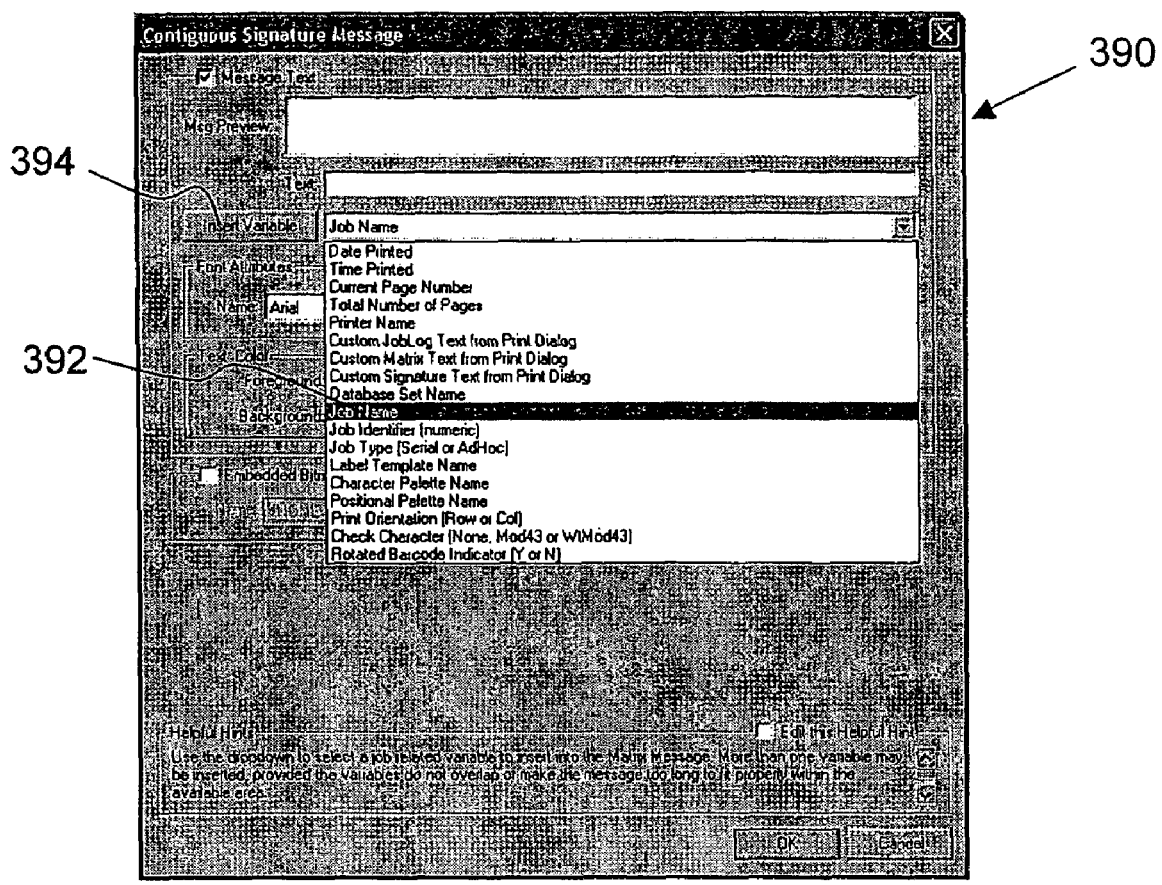
Figure 24:
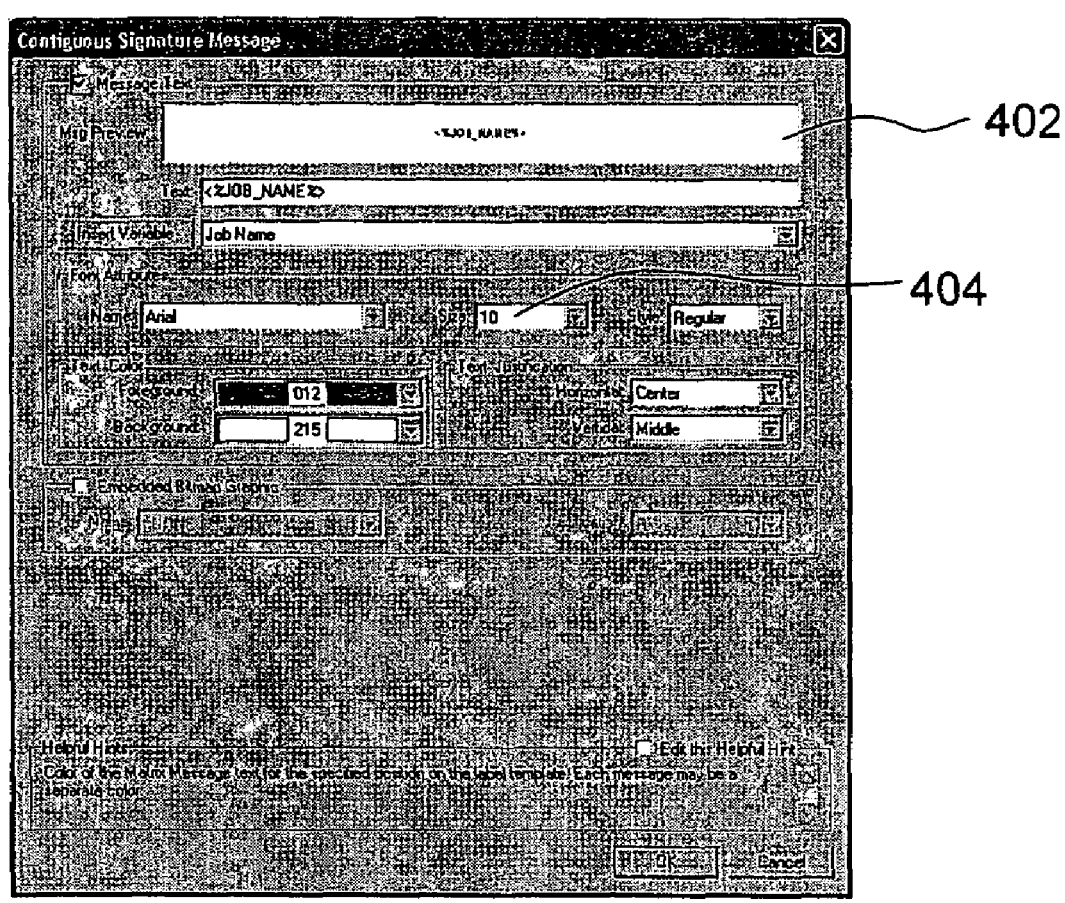

In FIG. 23, at screen 390, the Job Name variable 392 is inserted using the Insert Variable Button 393, to further customize the signature message. As shown in FIG. 24, at screen 400, the variable is visible in the Message Preview Screen 402. Signature messages must be smaller that Matrix Messages generally, due to the smaller amount of room, therefore a smaller font is required. A font such as 10 pt font is chosen at Field 404, although others could be used.

Figure 25:
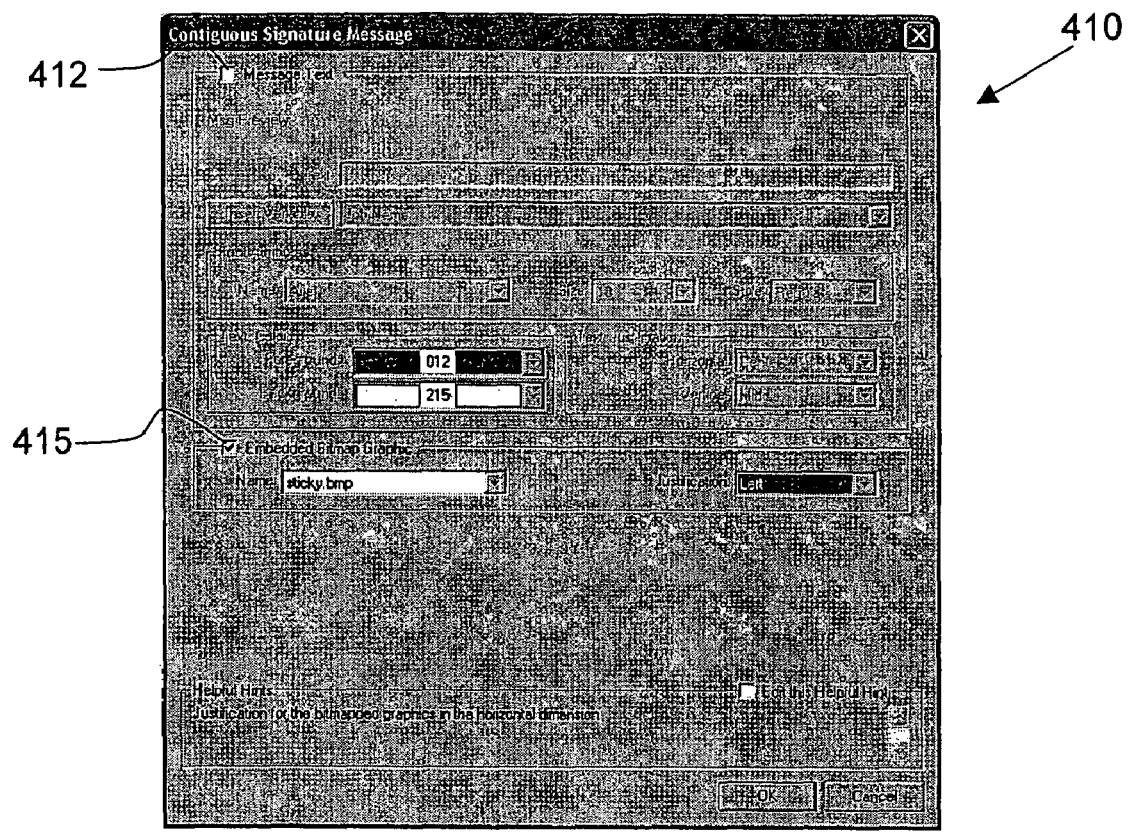

As shown in FIG. 25 at screen 410, embedded graphics may be used instead of text in the Signature Message. The user takes a desired bitmap, copies it to the graphics directory under the installation directory, then goes back and edits the Signature message. The user would turn off the text Check Box 412, enable the bitmap checkbox 415 and select the bitmap. In FIG. 25, the bitmap sticky.bmp was chosen with a left justification.

When bitmaps are used for either Signature or Matrix messages, they are stretched to fit the space in which they are placed. Accordingly, a larger sized bitmap will be shrunk to size and a smaller one will be expanded in size to best fit the space. A more refined appearance will be achieved using a bitmap if an initially larger bitmap is used. A bitmap may have only a few colors or many colors. Bitmaps with many colors create a better appearance than those with fewer colors because the printer can likely produce a better looking bitmap from a larger color palette.

Further, bitmaps are not rotated when placed in vertical messages. If the user must rotate the bitmap, then a second rotated version of the original bitmap should be created called for example sticky180.bmp. Then, when using bitmaps in messages, use the rotated one for vertical messages.

Figure 26:
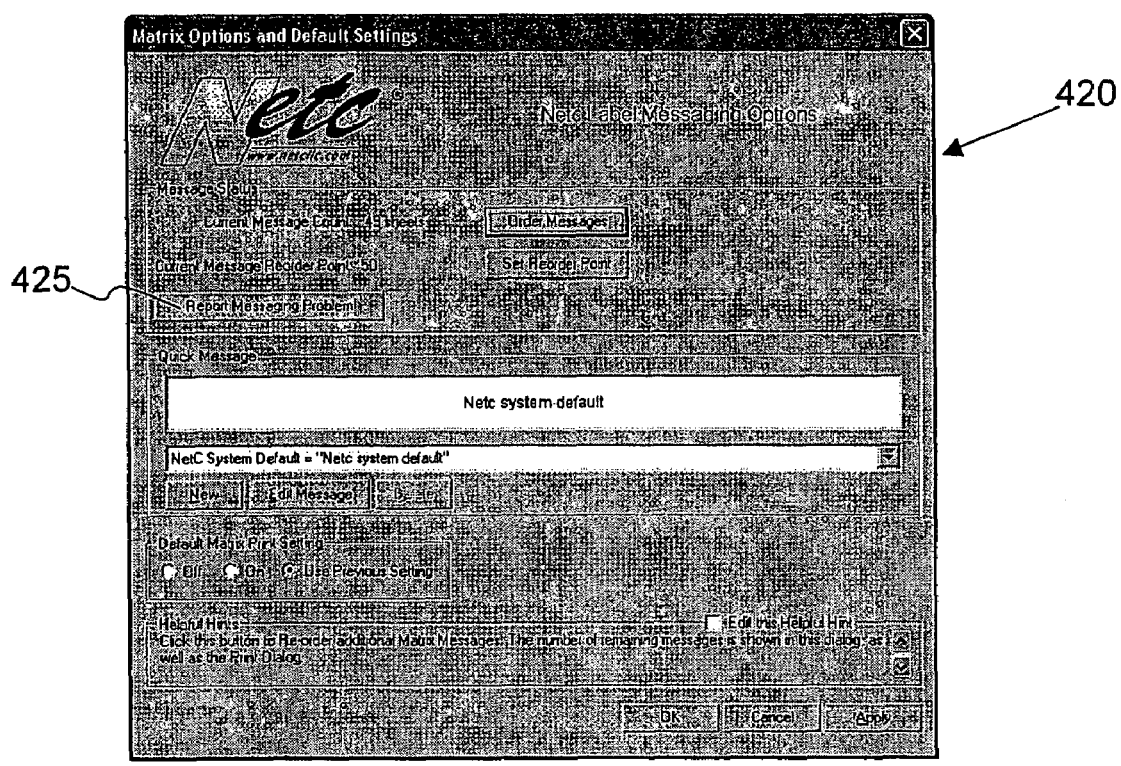
FIG. 26 is a display of a screen to generate and request assistance from the vendor.

Referring to FIG. 26, at screen 420, the user may click on the Report Messaging Problem button 425 when any problems are encountered any problems with the matrix and signature message program. The user is then instructed how to email a Message report file to the vendor with necessary prompts.

The present invention has been described with particular reference to the preferred embodiment. It should be understood that the foregoing descriptions and examples are only illustrative of the present invention. Various alternatives and modifications thereof can be devised by those skilled in the art without departing from the spirit and scope of the present invention. Accordingly, the present invention is intended to embrace all such alternatives, modifications, and variations that fall within the scope of the appended claims.

I claim:

1. A label matrix removably affixed to a film backing, each label in said label matrix being adapted for removal from said backing and adherence to a tape cartridge, said label matrix comprising:
    plural label rows including first and second label rows;
    each label including first and second parallel and adjacent data columns;
    said first data column including a barcode, the barcode related to the contents of the tape cartridge;
    said second data column including human readable characters related to the barcode; and
    an indicia portion unrelated to said barcode disposed in said second data column, extending parallel with and adjacent to said barcode in said first data column and not overlapping with said human readable characters.

2. The label matrix of claim 1 further comprising a second indicia portion unrelated to said barcode disposed between said first and second label rows and spaced from each of said first and second label rows.

3. The label matrix of claim 1 wherein said indicia portion is one or more of a company identifier, a confidentiality classifier, a time limit identifier; and a sales message.

* * * * *